(12) United States Patent
Choi et al.

(10) Patent No.: US 7,455,895 B2
(45) Date of Patent: Nov. 25, 2008

(54) POLARIZING LIQUID CRYSTAL FILM AND METHOD FOR MANUFACTURING THE SAME, LIGHT GUIDE PLATE INTEGRATED WITH POLARIZING LIQUID CRYSTAL FILM AND BACKLIGHT UNIT

(75) Inventors: Seong Sik Choi, Seoul (KR); Sung Tae Kim, Daejeon (KR); Hun Kyun Pak, Daejeon (KR); Tae Seok Jang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 269 days.

(21) Appl. No.: 11/415,131

(22) Filed: May 1, 2006

(65) Prior Publication Data
US 2007/0098923 A1 May 3, 2007

(30) Foreign Application Priority Data
Oct. 31, 2005 (KR) .................. 10-2005-0103133

(51) Int. Cl.
*C09K 19/00* (2006.01)
*C09K 19/56* (2006.01)
(52) U.S. Cl. .................. 428/1.1; 428/1.2; 349/176; 252/299.01; 430/20; 430/270.1
(58) Field of Classification Search .................. 430/20, 430/270.1; 428/1.1, 1.2; 252/299.01; 349/176
See application file for complete search history.

(56) References Cited

U.S. PATENT DOCUMENTS
2007/0008460 A1* 1/2007 Takeda et al. .................. 349/98

* cited by examiner

*Primary Examiner*—Geraldina Visconti
(74) *Attorney, Agent, or Firm*—Cantor Colburn LLP

(57) ABSTRACT

The present invention relates to a polarizing liquid crystal film having no alignment layer and a method for manufacturing the same, a light guide plate integrated with the polarizing liquid crystal film, and a backlight unit. The polarizing liquid crystal film of the present invention includes an adhesive layer, a liquid crystal layer aligned on one side of the adhesive layer, and a protection film arranged on an opposite side of the adhesive layer to protect the liquid crystal layer. Further, the method for manufacturing a polarizing liquid crystal film includes preparing a liquid crystal alignment film, aligning liquid crystal on the liquid crystal alignment film, providing an adhesive layer on the liquid crystal, attaching a protection film protecting the liquid crystal on the adhesive layer, and exfoliating the liquid crystal alignment film. Furthermore, there is provided a light guide plate integrated with the polarizing liquid crystal film and a backlight unit including the same.

23 Claims, 7 Drawing Sheets

FIG.1

(PRIOR ART)

FIG.2A

(PRIOR ART)

FIG.2B

(PRIOR ART)

FIG.3A

(PRIOR ART)

POLARIZING LIQUID CRYSTAL FILM AND METHOD FOR MANUFACTURING THE SAME, LIGHT GUIDE PLATE INTEGRATED WITH POLARIZING LIQUID CRYSTAL FILM AND BACKLIGHT UNIT

This application claims priority to Korean Patent Application No. 10-2005-0103133, filed on Oct. 31, 2005 and all the benefits accruing therefrom under 35 U.S.C. §119, and the contents of which in its entirety are herein incorporated by reference.

BACKGROUND OF THE INVENTION

1. Field of the Invention

The present invention relates to a polarizing liquid crystal film and a method for manufacturing the same. More particularly, the present invention relates to a polarizing liquid crystal film having no alignment layer and a method for manufacturing the same, a light guide plate integrated with the polarizing liquid crystal film, and a backlight unit.

2. Description of the Related Art

In general, the application range of a liquid crystal display ("LCD") has been extended because LCDs possess good lightweight, thin, low-power drive, full color and high resolution characteristics. LCDs have been currently used in computers, notebook computers, PDAs, telephones, TVs, audio/video devices, and the like. Such LCDs are used to adjust an amount of light transmitted in accordance with image signals applied to a number of control switches arrayed in a matrix form and then display a desired image on an LCD panel. Since the LCD cannot emit light by itself, it requires a light source such as a backlight unit.

Figure 1:
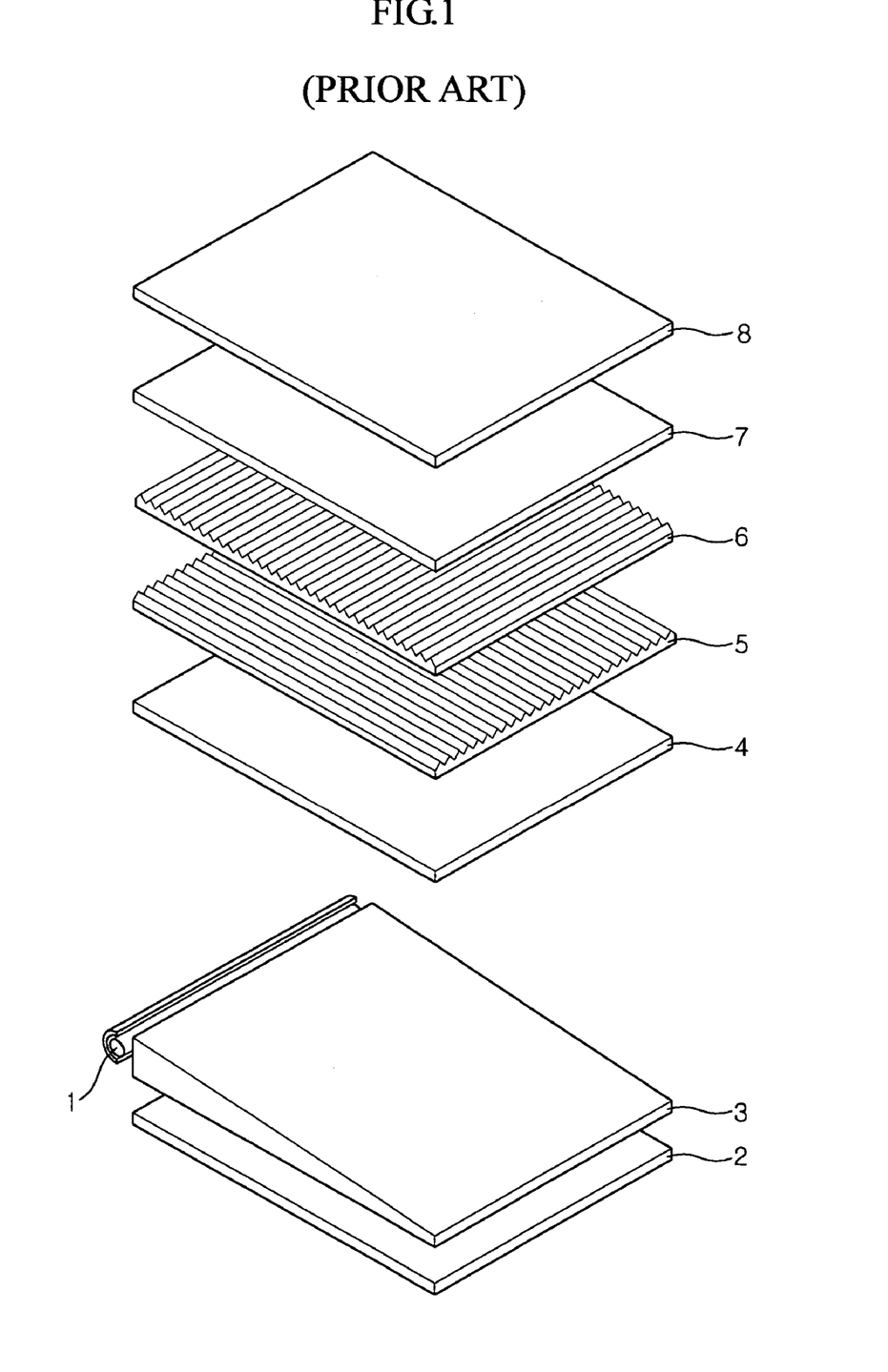
FIG. 1 is an exploded perspective view of a general backlight unit for a liquid crystal display ("LCD")

FIG. 1 is an exploded perspective view of a general backlight unit for an LCD, which corresponds to an edge-type backlight unit. Referring to FIG. 1, the backlight unit includes a lamp 1, a reflection plate 2, a light guide plate 3, a diffusion plate 4, a first prism sheet 5, a second prism sheet 6, and a brightness enhancement film 7. An LCD panel 8 is disposed on the top of the backlight unit. Visible light emitted from the lamp 1 travels to the light guide plate 3 having an inclined bottom surface, and the light is then guided toward a top surface of the light guide plate 3. At this time, the light passing through the top surface of the light guide plate 3 is emitted not only vertically but also at a variety of angles from the top surface of the light guide plate 3. The diffusion plate 4 diffuses light incident from the light guide plate 3 to prevent the light from being partially focused. Each of the first and second prism sheets 5 and 6 is formed with triangular prisms arrayed in a certain direction on a surface thereof, and the prisms of the first and second prism sheets 5 and 6 are arranged to extend in directions which cross each other. The first and second prism sheets 5 and 6 serve to focus the light diffused from the diffusion plate 4 in a direction perpendicular to a plane of the LCD panel 8.

The brightness enhancement film 7 is a film for enhancing brightness and providing a wide light viewing angle by reducing the loss of light emitted from the prism sheets 5 and 6. A dual brightness enhance film ("DBEF") or diffuse reflective polarizer film ("DRPF") sheet is generally used as the brightness enhancement film. The DBEF or DRPF sheet is a reflective polarizing film taking the shape of a thin film and prevents light from being absorbed into a bottom polarizing plate of the LCD panel 8. The DBEF or DDRPF sheet also serves to enhance the brightness of the LCD panel 8 by allowing the light, which will be absorbed and vanished in this manner, to be reused.

In the case of a conventional backlight unit, since a plurality of optical sheets are arranged on the top of a light guide plate, the total thickness of a backlight unit is inevitably increased. Further, since light incident from a light source passes through the plurality of optical sheets and then propagates to an LCD panel, there is a problem in that the loss of light occurs. Furthermore, there is another problem in that the unit cost of production is increased since the DBEF and DRPF sheets are very expensive.

Figure 2A:
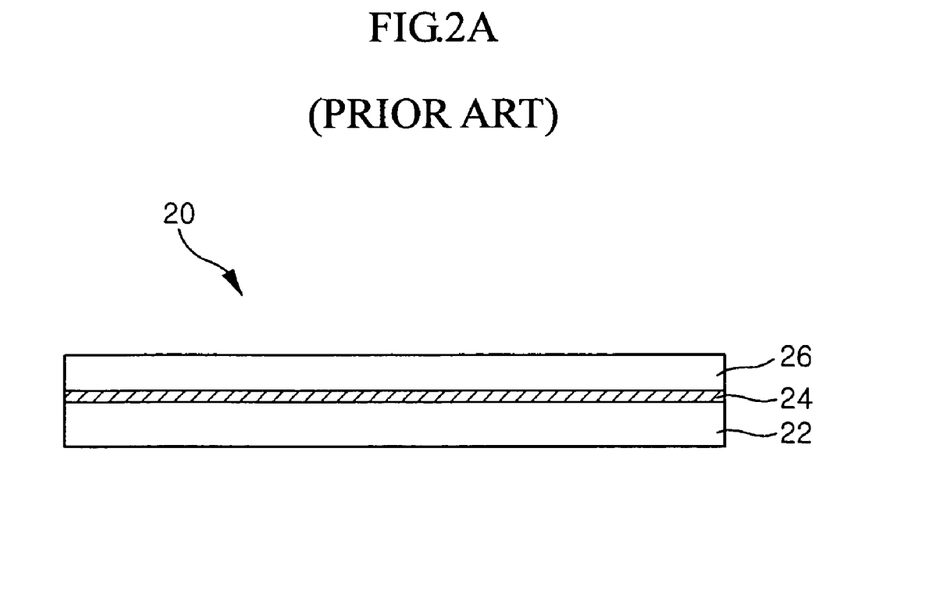
FIG. 2A is a sectional view of a conventional polarizing liquid crystal film.
Figure 2B:
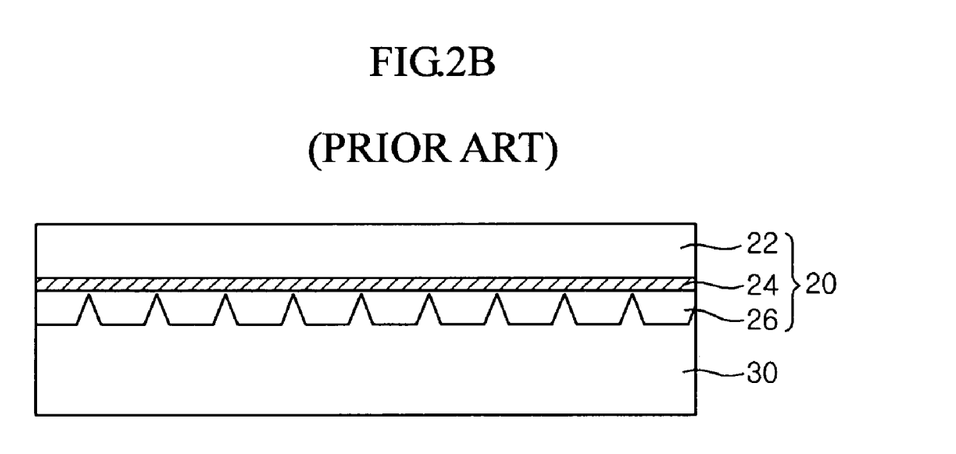
FIG. 2B is a sectional view of a light guide plate with the conventional polarizing liquid crystal film of FIG. 2A attached thereto.

FIG. 2A is a sectional view of a conventional polarizing liquid crystal film, and FIG. 2B is a sectional view of a light guide plate with the polarizing liquid crystal film of FIG. 2A attached thereto.

As shown in FIG. 2A, if liquid crystal polymers ("LCPs") with a high refractive index, which causes a polarization effect, are aligned on the top of a light guide plate, the brightness of a display can be enhanced without using an expensive brightness enhancement film.

Referring again to FIG. 2A, the polarizing liquid crystal film 20 includes a TriAcetyl Cellulose("TAC") sheet 22 serving as a protection film, an alignment layer 24 disposed on the TAC sheet 22, and liquid crystal 26 aligned on the alignment layer 24. FIG. 2B shows a light guide plate integrated with a polarizing liquid crystal film in which the polarizing liquid crystal film 20 of FIG. 2A is attached to a light guide plate 30. At this time, the liquid crystal 26 of the polarizing liquid crystal film 20 is arranged on a surface of the light guide plate 30 from which light is emitted. The polarizing liquid crystal film 20 prevents light from being absorbed into the bottom polarizing plate of the LCD panel by polarizing predetermined light components to be vanished.

Figure 3A:
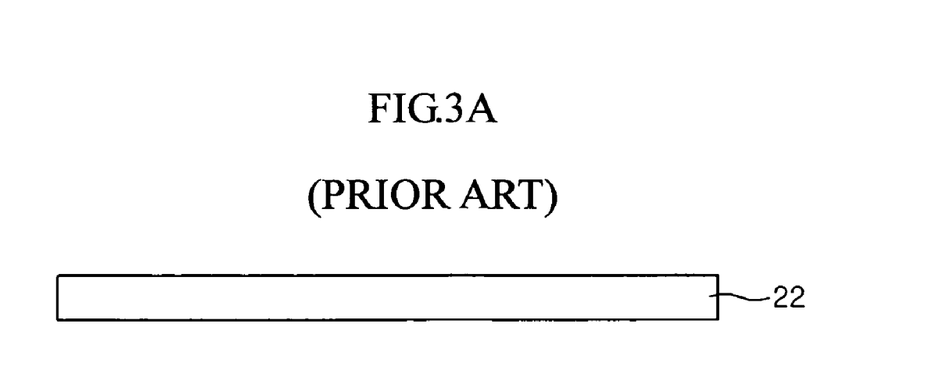
FIGS. 3A to 3D are sectional views illustrating a process of manufacturing a conventional polarizing liquid crystal film and a light guide plate integrated with the conventional polarizing liquid crystal film.
Figure 3B:
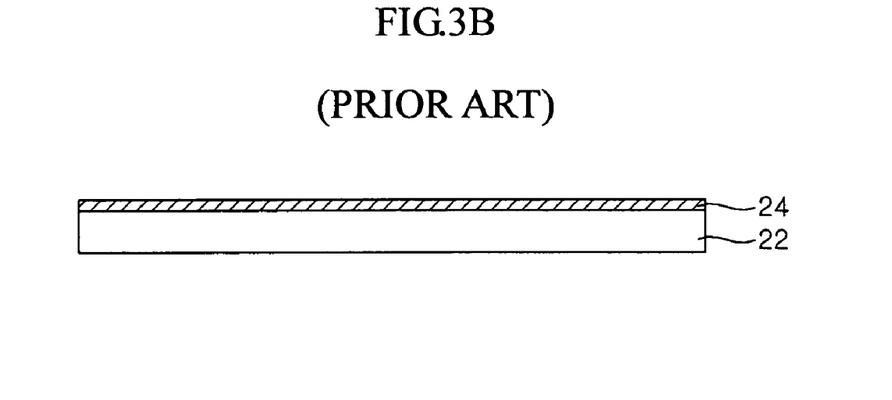
Figure 3C:
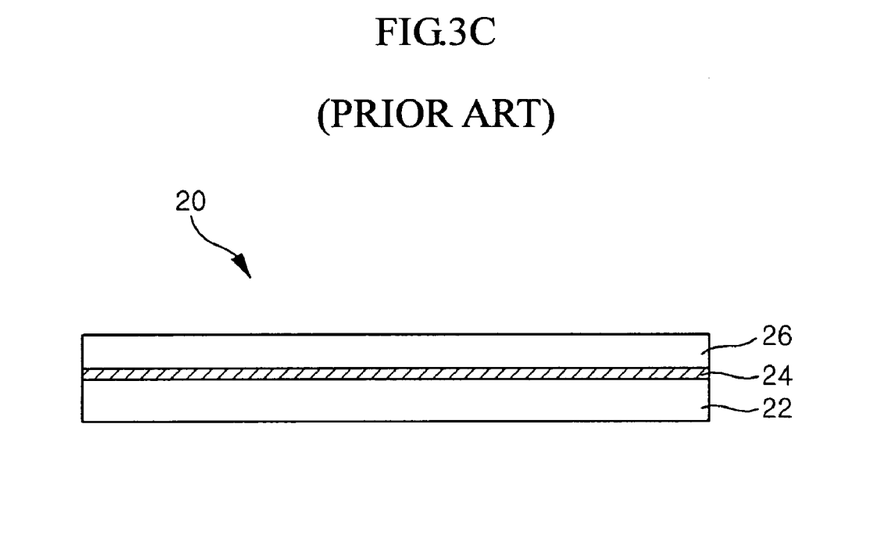

FIGS. 3A to 3D are sectional views illustrating a process of manufacturing the conventional polarizing liquid crystal film and a light guide plate integrated with the polarizing liquid crystal film. Referring to FIGS. 3A to 3D, a TAC sheet 22 is first provided as a protection film, as shown in FIG. 3A. Then, a thin alignment layer 24 for aligning liquid crystal is formed on the TAC sheet 22, as shown in FIG. 3B. Since the liquid crystal alignment is easily broken due to a surface friction force on the TAC sheet 22, the liquid crystal 26, as described with respect to FIG. 3C, cannot be aligned directly on the TAC sheet 22. Therefore, the thin alignment layer 24 is formed as described above. Further, the thin alignment layer 24 is formed extremely thin at a thickness of about several angstroms (Å). At this time, the thin alignment layer 24 is mainly made of polyimide. Then, the thin alignment layer 24 is rubbed in a single direction such that the liquid crystal 26 is aligned on a surface of the alignment layer 24 in a certain direction. Next, the liquid crystal 26 is applied on the thin alignment layer 24, and thus, the polarizing liquid crystal film is manufactured, as shown in FIG. 3C.

Figure 3D:
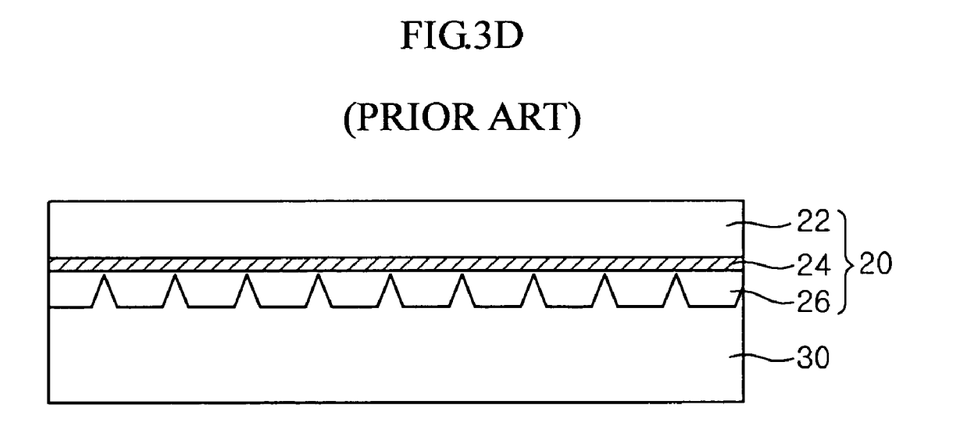

After the manufactured polarizing liquid crystal film 20 is disposed on the top of the light guide plate 30, a compression process is executed. Thus, a light guide plate integrated with a polarizing liquid crystal film is formed, as shown in FIG. 3D. At this time, the liquid crystal 26 of the polarizing liquid crystal film 20 is arranged on the top of the light guide plate 30 which corresponds to a light exiting surface of the light guide plate 30.

As described above, a process of forming a thin alignment layer on a TAC sheet is needed to manufacture a polarizing liquid crystal film. To this end, however, extremely various and complex processes are performed. Therefore, there is a problem in that the unit cost of production is increased and the productivity and efficiency are decreased.

BRIEF SUMMARY OF THE INVENTION

The present invention solves the aforementioned problems in the prior art. Accordingly, the present invention provides a polarizing liquid crystal film and a method for manufacturing the same, a light guide plate integrated with the same and a backlight unit, wherein an alignment layer forming process can be eliminated to simplify a manufacturing process and reduce a unit cost of production.

According to exemplary embodiments of the present invention, there is provided a polarizing liquid crystal film including an adhesive layer, a liquid crystal layer aligned on one side of the adhesive layer, and a protection film arranged on an opposite side of the adhesive layer to protect the liquid crystal layer.

The adhesive layer may be an adhesive sheet, the liquid crystal layer may be aligned on one surface of the adhesive sheet, and the protection film may be arranged on an opposite surface of the adhesive sheet.

The liquid crystal layer may include a liquid crystal polymer ("LCP").

The adhesive layer may be a double-coated adhesive sheet.

Preferably, the adhesive layer includes an isotropic material.

More preferably, the adhesive layer includes a transparent material.

The protection film may include triacetyl cellulose ("TAC").

According to another exemplary embodiment of the present invention, there is provided an exemplary method for manufacturing a polarizing liquid crystal film including preparing a liquid crystal alignment film, aligning liquid crystal on the liquid crystal alignment film, providing an adhesive layer on the liquid crystal, attaching a protection film protecting the liquid crystal on the adhesive layer, and exfoliating the liquid crystal alignment film.

Preparing a liquid crystal alignment film may include rubbing the liquid crystal alignment film.

Aligning liquid crystal on the liquid crystal alignment film may include applying the liquid crystal on the liquid crystal alignment layer, and performing heat treatment.

According to a further exemplary embodiment of the present invention, a light guide plate integrated with a polarizing liquid crystal film includes the polarizing liquid crystal film having an adhesive layer, a liquid crystal layer aligned on one side of the adhesive layer, and a protection film arranged on an opposite side of the adhesive layer to protect the liquid crystal layer; wherein the polarizing liquid crystal film is arranged on a surface of the light guide plate from which light is emitted.

Preferably, the polarizing liquid crystal film is pressed onto the surface of the light guide plate from which light is emitted and then formed integrally with the light guide plate.

A plurality of prisms focusing emitted light may be formed on the surface of the light guide plate from which light is emitted.

According to a still further exemplary embodiment of the present invention, there is provided a backlight unit including a light guide plate integrated with a polarizing liquid crystal film as described above, and at least one light source arranged on at least one side of the light guide plate.

BRIEF DESCRIPTION OF THE DRAWINGS

The above and other features and advantages of the present invention will become apparent from the following description of preferred embodiments given in conjunction with the accompanying drawings, in which.

DETAILED DESCRIPTION OF THE INVENTION

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Certain layers and regions may be exaggerated for clarity.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a preferred embodiment of the present invention will be described in detail with reference to the accompanying drawings.

Figure 4A:
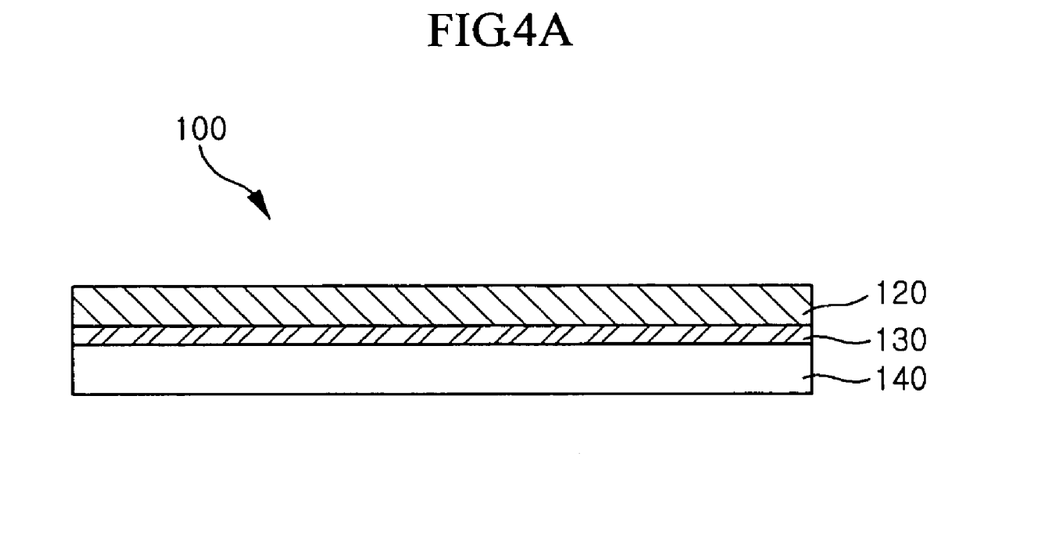
FIG. 4A is a sectional view of an exemplary embodiment of a polarizing liquid crystal film according to the present invention.
Figure 4B:
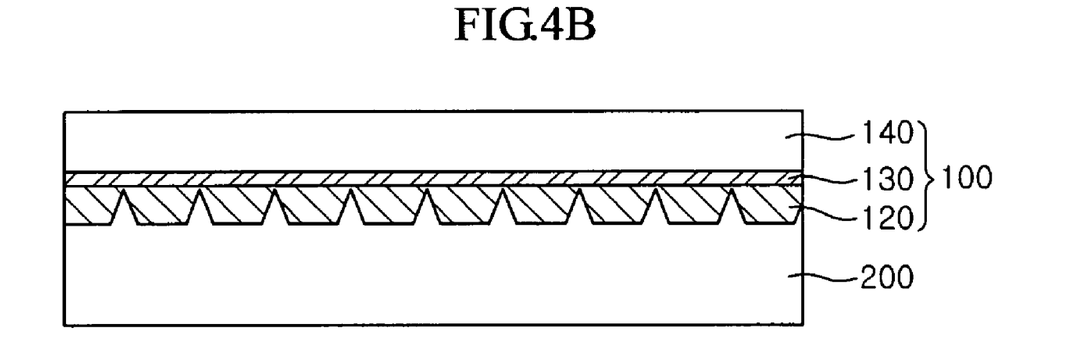
FIG. 4B is a sectional view of an exemplary light guide plate integrated with the exemplary embodiment of the polarizing liquid crystal film of FIG. 4A is attached.

FIG. 4A is a sectional view of an exemplary embodiment of a polarizing liquid crystal film according to the present invention, and FIG. 4B is a sectional view of an exemplary light guide plate integrated with the exemplary embodiment of the polarizing liquid crystal film of FIG. 4A.

Referring to FIG. 4A, the polarizing liquid crystal film 100 includes a triacetyl cellulose ("TAC") sheet 140 serving as a protection film, an adhesive layer 130 disposed on the TAC sheet 140, and a liquid crystal layer 120 aligned on the adhesive layer 130.

Although the TAC sheet 140 is used as a protection film for protecting the liquid crystal layer, the present invention is not limited thereto. Any other materials, which have high light transmittance and relatively low double refraction and can be easily laminated onto polarizing elements due to good hydrophilicity by surface modification, may be used instead of the TAC sheet 140.

The adhesive layer 130 is preferably a double-coated adhesive sheet that serves as a support to which the liquid crystal layer 120 and the TAC sheet 140 are attached and fixed. Further, it is preferred that the double-coated adhesive sheet be made of an isotropic material so as not to have influence on the polarization property of the liquid crystal layer 120. While a double-coated adhesive 'sheet is described as the adhesive layer 130, it should be understood that other embodiments of an adhesive layer would also be within the scope of these embodiments.

The liquid crystal layer 120 is formed of a liquid crystal polymer ("LCP"). The LCP is a high molecular material exhibiting a liquid crystal property in a solution or in a molten state. The LCP can be specified as movement of rigid rod-like or disk-like molecules. Further, the LCP can be easily aligned by shear deformation and well stretched during the processing thereof. Furthermore, owing to its peculiar physical structure composed of aligned layers, the LCP has high strength, high modulus of elasticity, high heat resistance, low coefficient of expansion almost close to that of ceramics, and good chemical resistance in accordance with its chemical structure.

At this time, the LCP is formed of a main chain LCP, a side chain LCP or a mixture thereof. The main chain LCP includes polyester based LCP, polyamide based LCP, polycarbonate based LCP, polyimide based LCP, polyurethane based LCP, polybenzimidazole based LCP, and the like. Further, the side chain LCP includes a straight chain LCP such as polyacrylate based LCP, polymethacrylate based LCP, polyvinyl based LCP or polysiloxane based LCP; an LCP in which a mesogenic group is bonded as a side chain to a material having a cyclic structure skeleton chain; or a mixture thereof.

Accordingly, if an LCP capable of imparting a specific orientation is used to compensate for an optical characteristic of an LCD, unnecessary bonding works during the process can be reduced, the process can be simplified, and the thickness of an LCD panel can also be reduced.

FIG. 4B shows an exemplary light guide plate integrated with an exemplary embodiment of a polarizing liquid crystal film in which the exemplary embodiment of the polarizing liquid crystal film 100 of FIG. 4A is attached to and integrally formed with the light guide plate 200. The polarizing liquid crystal film 100 is attached to the light guide plate 200 in such a manner that the liquid crystal layer 120 is disposed on a surface of the light guide plate 200 from which light is emitted, and the adhesive layer 130, such as a double-coated adhesive sheet, and the TAC sheet 140 are sequentially disposed on the top of the liquid crystal layer 120. At this time, the polarizing liquid crystal film 100 is attached to and integrally formed with the light guide plate 200 through a compression process. A method for attaching the polarizing liquid crystal film 100 to the light guide plate 200 is not limited thereto, but an adhesive or glue may be used for their attachment.

As described above, if the polarizing liquid crystal film 100 and the light guide plate 200 are integrally formed with each other, predetermined light components that would otherwise be vanished are polarized by the polarizing liquid crystal film 100, so that the absorption of light into the bottom polarizing plate of the LCD panel can be prevented. As a result, an effect of enhancing brightness can be obtained.

Figure 5:
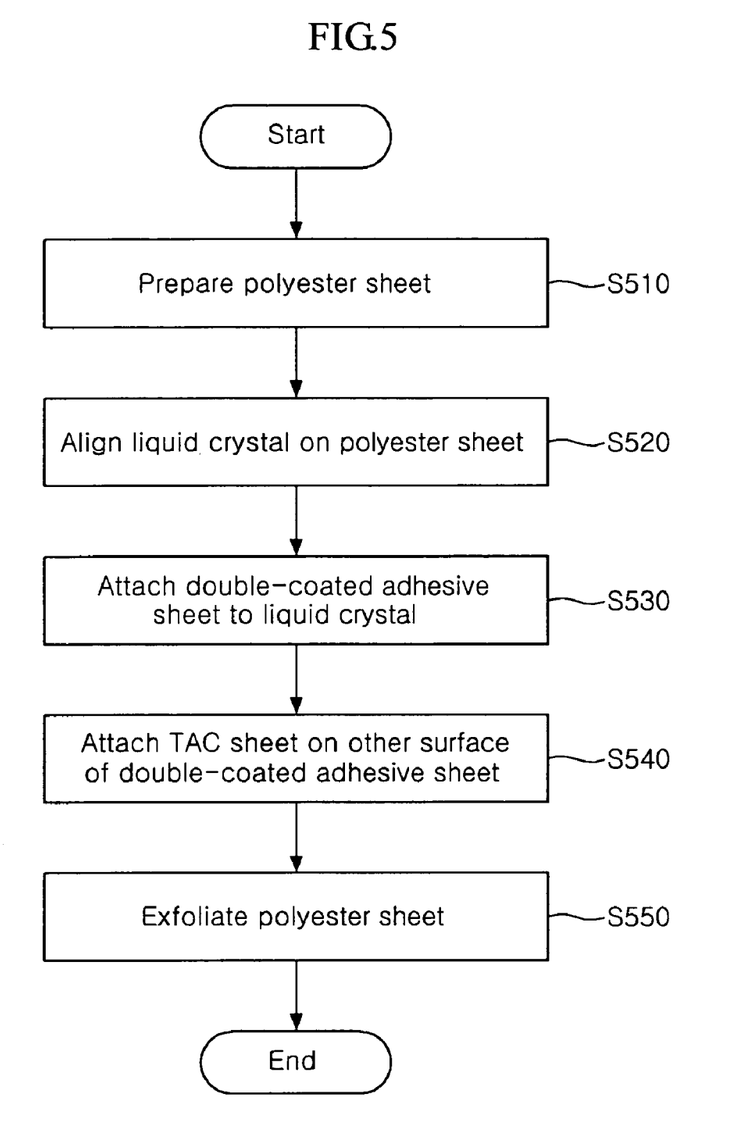
FIG. 5 is a flowchart illustrating an exemplary method for manufacturing an exemplary embodiment of a polarizing liquid crystal film according to the present invention.

FIG. 5 is a flowchart illustrating an exemplary method for manufacturing an exemplary embodiment of a polarizing liquid crystal film according to the present invention.

With reference to FIG. 5, a method for manufacturing a polarizing liquid crystal film according to the present invention first includes preparing a liquid crystal alignment film as shown by S510, and then liquid crystal is aligned on the prepared liquid crystal alignment film as shown by S520. At this time, the liquid crystal alignment film uses a film on which the liquid crystal can be easily aligned. A polyester ("PET") sheet is preferably used in this embodiment. However, while preparation of a polyester sheet is illustrated in FIG. 5, a material for use as the liquid crystal alignment film is not limited to PET, and any materials having such a characteristic that a liquid crystal alignment is not broken and the aligned liquid crystal can be easily exfoliated can be used as the liquid crystal alignment film, and thus the present invention is not limited to the illustrated exemplary method.

At this time, an LCP capable of easily imparting a specific orientation to the liquid crystal alignment film is used as the liquid crystal aligned on the liquid crystal alignment film as described above. Meanwhile, the liquid crystal alignment film, i.e. a polyester sheet, can be rubbed to facilitate the liquid crystal alignment.

When aligning the liquid crystal on the liquid crystal alignment film as shown by S520, the liquid crystal can be applied on the liquid crystal alignment film and heat treatment may then be executed to fix the liquid crystal alignment.

Next, a process of attaching an adhesive layer, such as, but not limited to, a double-coated adhesive sheet, to one surface of the aligned liquid crystal is implemented as shown by S530. Then, a protection film for protecting the liquid crystal is attached to the other surface of the adhesive layer, such as the double-coated adhesive sheet, as shown by S540.

At this time, a TAC sheet, which has high light transmittance and relatively low double refraction and can be easily laminated onto polarizing elements due to good hydrophilicity by surface modification, is used as the protective film. Further, it is preferred that the adhesive layer 130 is a double-coated adhesive sheet made of an isotropic material so as not to have influence on the polarization property of a liquid crystal layer.

Then, the liquid crystal alignment film, i.e. a polyester sheet, is exfoliated or otherwise removed from the liquid crystal layer, as shown by S550.

If the polarizing liquid crystal film is manufactured through the aforementioned exemplary process of the present invention, the polarizing liquid crystal film can be easily manufactured without using a thin alignment layer which is difficult to manufacture.

FIGS. 6A to 6E are sectional views illustrating an exemplary process of manufacturing an exemplary embodiment of a polarizing liquid crystal film according to the present invention.

Figure 6A:
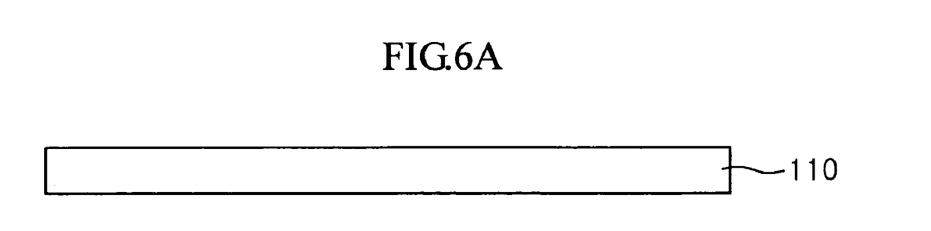
FIGS. 6A to 6E are sectional views illustrating an exemplary process of manufacturing an exemplary embodiment of a polarizing liquid crystal film according to the present invention.
Figure 6B:
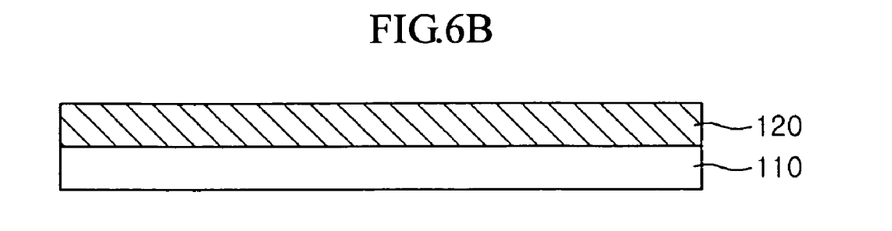

Referring to FIGS. 6A to 6E, a polyester sheet 110, employed as the liquid crystal alignment film, is first prepared as a film for use in aligning liquid crystal as shown in FIG. 6A. Next, liquid crystal is aligned on the polyester sheet 110 to form a liquid crystal layer 120, as shown in FIG. 6B. At this time, a liquid crystal polymer ("LCP") capable of easily imparting a specific orientation is used as the liquid crystal.

Figure 6C:
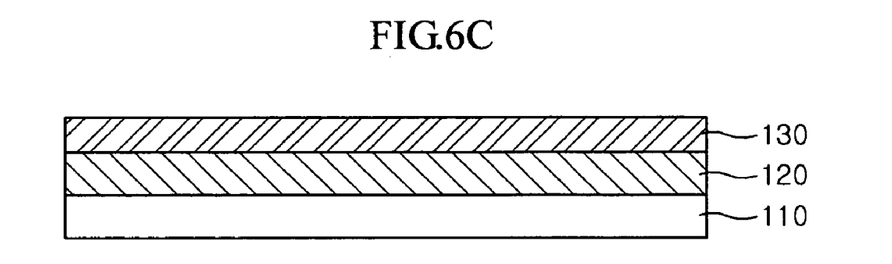
Figure 6D:
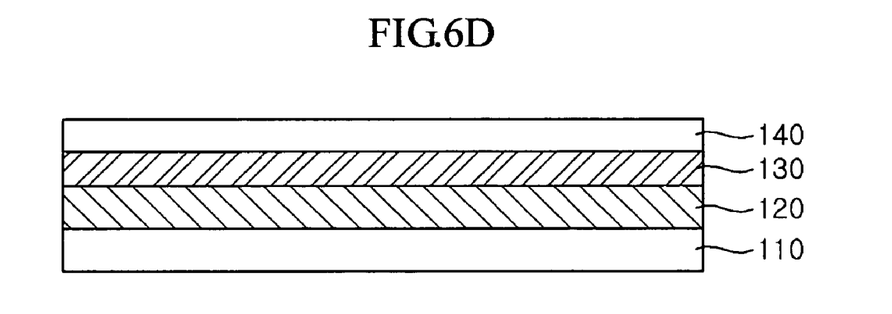

Then, a double-coated adhesive sheet 130, employed as the adhesive layer, is attached to the liquid crystal layer 120, as shown in FIG. 6C. Next, a TAC sheet 140 serving as a protection film is attached to the double-coated adhesive sheet 130 as shown in FIG. 6D.

Figure 6E:
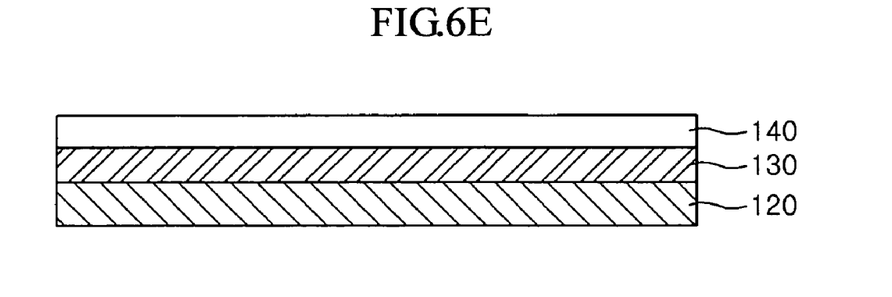

Finally, the polyester sheet 110 is exfoliated from the liquid crystal layer 120, or otherwise removed, and thus, the polarizing liquid crystal film can be manufactured as shown in FIG. 6E.

Figure 7:
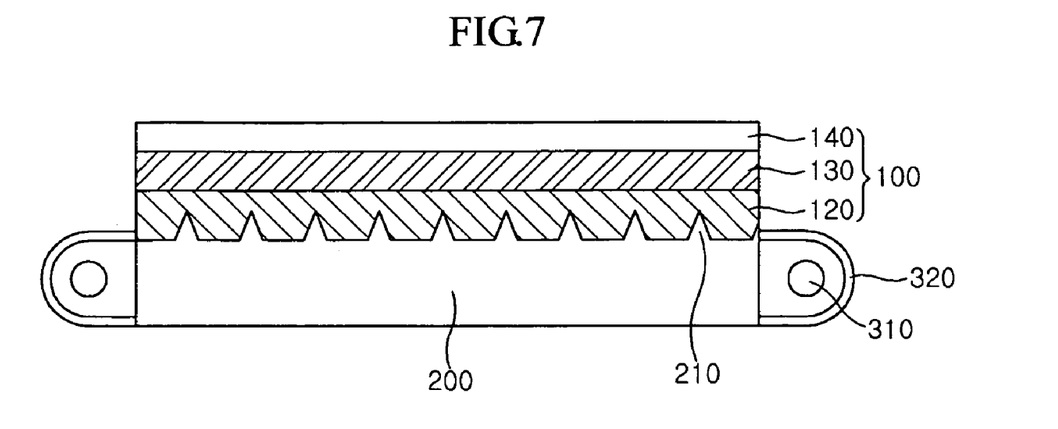
FIG. 7 is a schematic sectional view of an exemplary backlight unit including an exemplary light guide plate integrated with an exemplary embodiment of a polarizing liquid crystal film according to the present invention.

FIG. 7 is a schematic sectional view of an exemplary backlight unit including an exemplary light guide plate integrated with an exemplary embodiment of a polarizing liquid crystal film according to the present invention.

The backlight unit shown in FIG. 7 includes a light source 310, such as a lamp, a reflection plate 320, and a light guide plate 200 integrated with a polarizing liquid crystal film 100. Thus, the integrated light guide plate includes the light guide plate 200, and the polarizing liquid crystal film 100 integrally formed on the light guide plate 200.

The polarizing liquid crystal film 100 includes a TAC sheet 140 serving as a protection film, a double-coated adhesive sheet 130 serving as an adhesive layer disposed on the TAC sheet 140, and a liquid crystal layer 120 aligned on the double-coated adhesive sheet 130. The liquid crystal layer 120 is attached to a light emitting surface of the light guide plate 200, i.e. a top surface of the light guide plate 200.

At this time, a prism unit 210 composed of a plurality of prisms can be formed on the top surface of the light guide plate 200. The prism, unit 210 can prevent light emitted from the light source 310 from being deviated from a direction toward an LCD panel.

The light source 310 is formed on at least one side of the light guide plate 200, and the reflection plate 320 is formed at one side of the light source 310. An inner surface of the reflection plate 320 is coated with metal to enhance reflection characteristics. Thus, light traveling in a direction away from the light guide plate 200 is reflected back towards the light guide plate 200 and then incident on the light guide plate 200.

As described above, the present invention is configured in such a manner that liquid crystal is first aligned on a liquid crystal alignment film, a polarizing liquid crystal film is then manufactured, and the liquid crystal alignment film is finally exfoliated. Thus, a complex alignment layer forming process can be eliminated. Therefore, a polarizing liquid crystal film having an excellent polarizing property can be manufactured while simplifying the manufacturing process and also reducing the unit cost of production.

The foregoing is merely exemplary embodiments of a polarizing liquid crystal film and a method for manufacturing the same, and a light guide plate integrated with the polarizing liquid crystal film, and a backlight unit according to the present invention. Therefore, the present invention is not limited to the aforementioned embodiments. It will be readily understood by those skilled in the art that various modifications and changes can be made thereto within the technical spirit and scope of the present invention. It is also apparent that the modifications and changes fall within the scope of the present invention defined by the appended claims.

What is claimed is:

1. A polarizing liquid crystal film, comprising:
   an adhesive layer;
   a liquid crystal layer aligned on one side of the adhesive layer; and
   a protection film arranged on an opposite side of the adhesive layer to protect the liquid crystal layer.

2. The polarizing liquid crystal film as claimed in claim 1, wherein the adhesive layer is an adhesive sheet, the liquid crystal layer is aligned on one surface of the adhesive sheet, and the protection film is arranged on an opposite surface of the adhesive sheet.

3. The polarizing liquid crystal film as claimed in claim 1, wherein the liquid crystal layer comprises a liquid crystal polymer.

4. The polarizing liquid crystal film as claimed in claim 1, wherein the adhesive layer is a double-coated adhesive sheet.

5. The polarizing liquid crystal film as claimed in claim 1, wherein the adhesive layer comprises an isotropic material.

6. The polarizing liquid crystal film as claimed in claim 1, wherein the adhesive layer comprises a transparent material.

7. The polarizing liquid crystal film as claimed in claim 1, wherein the protection film comprises triacetyl cellulose.

8. A method for manufacturing a polarizing liquid crystal film, the method comprising:
   preparing a liquid crystal alignment film;
   aligning liquid crystal on the liquid crystal alignment film;
   providing an adhesive layer on the liquid crystal;
   attaching a protection film protecting the liquid crystal on the adhesive layer; and
   exfoliating the liquid crystal alignment film.

9. The method as claimed in claim 8, wherein preparing a liquid crystal alignment film comprises rubbing the liquid crystal alignment film.

10. The method as claimed in claim 8, wherein the liquid crystal alignment film comprises polyester.

11. The method as claimed in claim 8, wherein aligning liquid crystal on the liquid crystal alignment film comprises:
    applying the liquid crystal on the liquid crystal alignment layer; and
    performing heat treatment.

12. The method as claimed in claim 8, wherein the liquid crystal comprises a liquid crystal polymer.

13. The method as claimed in claim 8, wherein providing an adhesive layer on the liquid crystal includes attaching an adhesive sheet on the liquid crystal.

14. The method as claimed in claim 13, wherein the adhesive sheet is a double-coated adhesive sheet.

15. The method as claimed in claim 13, wherein the adhesive sheet comprises an isotropic material.

16. The method as claimed in claim 13, wherein the adhesive sheet comprises a transparent material.

17. The method as claimed in claim 8, wherein the protection film comprises triacetyl cellulose.

18. A light guide plate integrated with a polarizing liquid crystal film, wherein the polarizing liquid crystal film comprises:
   an adhesive layer;
   a liquid crystal layer aligned on one side of the adhesive layer; and
   a protection film arranged on an opposite side of the adhesive layer to protect the liquid crystal layer, and
   the polarizing liquid crystal film is arranged on a surface of the light guide plate from which light is emitted.

19. The light guide plate as claimed in claim 18, wherein the adhesive layer is an adhesive sheet, the liquid crystal layer is aligned on one surface of the adhesive sheet, and the protection film is arranged on an opposite surface of the adhesive sheet.

20. The light guide plate as claimed in claim 18, wherein the polarizing liquid crystal film is pressed onto the surface of the light guide plate from which light is emitted and then formed integrally with the light guide plate.

21. The light guide plate as claimed in claim 18, wherein a plurality of prisms focusing emitted light is formed on the surface of the light guide plate from which light is emitted.

22. The light guide plate as claimed in claim 18, wherein the liquid crystal layer comprises a liquid crystal polymer.

23. A backlight unit, comprising:
   a light guide plate integrated with a polarizing liquid crystal film, the polarizing liquid crystal film comprising:
      an adhesive layer;
      a liquid crystal layer aligned on one side of the adhesive layer; and
      a protection film arranged on an opposite side of the adhesive layer to protect the liquid crystal layer, wherein the polarizing liquid crystal film is arranged on a surface of the light guide plate from which light is emitted; and
   at least one light source arranged on at least one side of the light guide plate.

\* \* \* \* \*